US012592402B2

(12) United States Patent
Kim et al.

(10) Patent No.: US 12,592,402 B2
(45) Date of Patent: Mar. 31, 2026

(54) HUMIDIFIER FOR FUEL CELL AND METHOD FOR MANUFACTURING SAME

(71) Applicant: KOLON INDUSTRIES, INC., Seoul (KR)

(72) Inventors: Do Woo Kim, Seoul (KR); In Ho Kim, Seoul (KR); Kyoung Ju Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 248 days.

(21) Appl. No.: 17/606,045

(22) PCT Filed: Jun. 24, 2020

(86) PCT No.: PCT/KR2020/008130
§ 371 (c)(1),
(2) Date: Oct. 24, 2021

(87) PCT Pub. No.: WO2020/262912
PCT Pub. Date: Dec. 30, 2020

(65) Prior Publication Data
US 2022/0255092 A1 Aug. 11, 2022

(30) Foreign Application Priority Data
Jun. 25, 2019 (KR) ........................ 10-2019-0075647

(51) Int. Cl.
*H01M 8/04119* (2016.01)
*H01M 8/028* (2016.01)

(52) U.S. Cl.
CPC ....... *H01M 8/04149* (2013.01); *H01M 8/028* (2013.01); *H01M 8/04141* (2013.01)

(58) Field of Classification Search
CPC .. H01M 8/028; H01M 8/0284; H01M 8/0286; H01M 8/04119; H01M 8/04126;
(Continued)

(56) References Cited

U.S. PATENT DOCUMENTS 6,316,139 B1 * 11/2001 Uchida ............... H01M 8/0271
429/510
8,974,667 B2 * 3/2015 Lee ...................... B01D 63/021
210/321.79
(Continued)

FOREIGN PATENT DOCUMENTS

CN 103069222 A 4/2013
CN 103346338 A 10/2013
(Continued)

OTHER PUBLICATIONS

JP2003065566A—Katagiri et al.—English translation via Espacenet (Year: 2003).*
(Continued)

*Primary Examiner* — Allison Bourke
*Assistant Examiner* — Bethany C Garcia
(74) *Attorney, Agent, or Firm* — Harvest IP Law, LLP

(57) ABSTRACT

Disclosed are: a humidifier for a fuel cell, which can reliably prevent gas leaks due to repeated operations and shutdowns of a fuel cell and can be manufactured with relatively low manufacturing costs and high productivity as well; and a method for manufacturing same. A humidifier for a fuel cell of the present invention comprises a humidification module and caps coupled to both ends of the humidification module, respectively. The humidification module comprises: a mid-case having a step on the inner peripheral surface thereof; a plurality of hollow fiber membranes in the mid-case; a fixation layer on which ends of the hollow fiber membranes are potted; a bracket which is supported by the step of the mid-case and is in contact with the fixation layer; and a packing member in contact with the bracket and having a groove into which an end of the mid-case is inserted.

13 Claims, 10 Drawing Sheets

(58) Field of Classification Search
CPC ......... H01M 8/04141; H01M 8/04149; H01M
8/0271; H01M 8/0273; H01M 8/0276;
H01M 2008/1095; H01M 8/04082; H01M
8/04097; H01M 8/04291; H01M 8/04492;
H01M 8/04014; H01M 8/04828; H01M
8/04425; H01M 2250/20; B01D 63/022;
B01D 63/069; B01D 2313/04; B01D
2313/025; B01D 63/0223; B01D 63/023;
B01D 63/021; B01D 63/024; B01D
2313/041; B01D 2313/21; B01D 2313/20;
B01D 2313/44; B01D 2313/22; B01D
2313/14; B01D 2313/201; B01D 2313/23;
B01D 63/02–043; B01D 2313/205; B01D
63/0233; B01D 63/0224; B01D 63/0231;
B01D 63/031; B01D 63/033; B01D
2313/08; B01D 2313/2031; B01D
2313/203; B01D 2313/208; B01D
2313/06; B01D 2315/22; B01D 2323/62;
Y02E 60/10; Y02E 60/50; Y02T 10/70;
Y02P 70/50
See application file for complete search history.

(56) References Cited

U.S. PATENT DOCUMENTS

| | | | |
|---|---|---|---|
| 2003/0029785 A1 | 2/2003 | Dannenmaier | |
| 2012/0015283 A1* | 1/2012 | Cha ...................... | H01M 8/1011 |
| | | | 429/516 |
| 2013/0306545 A1* | 11/2013 | Shinohara ............ | B01D 63/021 |
| | | | 210/321.89 |
| 2014/0291874 A1* | 10/2014 | Kim ...................... | B01D 63/02 |
| | | | 261/101 |
| 2016/0193570 A1* | 7/2016 | Kobayashi ........... | B01D 63/043 |
| | | | 210/232 |
| 2021/0057767 A1* | 2/2021 | Kim ...................... | B01D 63/021 |

FOREIGN PATENT DOCUMENTS

| | | | |
|---|---|---|---|
| CN | 105322202 A | | 2/2016 |
| JP | S6157207 A | | 3/1986 |
| JP | 2003065566 A | * | 3/2003 |
| JP | 2014522556 A | | 9/2014 |
| KR | 101396040 B1 | | 5/2014 |
| KR | 20140117346 A | | 10/2014 |
| KR | 20160015541 A | | 2/2016 |
| KR | 20160061988 A | | 6/2016 |
| WO | 9212787 A1 | | 8/1992 |
| WO | 0053293 A1 | | 9/2000 |
| WO | 2013100677 A1 | | 7/2013 |
| WO | 2013190022 A1 | | 12/2013 |

OTHER PUBLICATIONS

JP office action dated Nov. 8, 2022.
The search report dated May 30, 2023 related to the corresponding European Patent application.
The office action dated Aug. 19, 2023 related to the corresponding Chinese Patent application.

* cited by examiner

2130

(a)

A

A

2130

(b)

<u>2140</u>

(a)

(b)

2120'

2121'  2122-1'

2123

H

2120'

2121'  2122-1'  2123

2112

2112

2111

H

2110

HUMIDIFIER FOR FUEL CELL AND METHOD FOR MANUFACTURING SAME

CROSS REFERENCE TO RELATED APPLICATIONS

This application is a National Stage of International Application No. PCT/KR2020/008130 filed Jun. 24, 2020, claiming priority based on Korean Patent Application No. 10-2019-0075647 filed Jul. 25, 2019.

TECHNICAL FIELD

The present disclosure relates to a humidifier for a fuel cell and a method of manufacturing the same, and more particularly to a humidifier for a fuel cell capable of certainly preventing gas leakage due to repeated operation and stop of a fuel cell and being manufactured with relatively low manufacturing cost and high productivity and a method of manufacturing the same.

BACKGROUND ART

A fuel cell is a power generation cell that combines hydrogen and oxygen to generate electricity. The fuel cell has advantages in that it is possible to continuously generate electricity as long as hydrogen and oxygen are supplied, unlike a general chemical cell, such as a dry cell or a storage cell, and in that there is no heat loss, whereby efficiency of the fuel cell is about twice as high as efficiency of an internal combustion engine.

In addition, the fuel cell directly converts chemical energy generated by combination of hydrogen and oxygen into electrical energy, whereby the amount of contaminants that are discharged is small. Consequently, the fuel cell has advantages in that the fuel cell is environmentally friendly and in that a concern about depletion of resources due to an increase in energy consumption can be reduced.

Based on the kind of an electrolyte that is used, such a fuel cell may generally be classified into a polymer electrolyte membrane fuel cell (PEMFC), a phosphoric acid fuel cell (PAFC), a molten carbonate fuel cell (MCFC), a solid oxide fuel cell (SOFC), or an alkaline fuel cell (AFC).

These fuel cells are operated fundamentally by the same principle, but are different from each other in terms of the kind of fuel that is used, operating temperature, catalyst, and electrolyte. Among these fuel cells, the polymer electrolyte membrane fuel cell (PEMFC) is known as being the most favorable to a transportation system as well as small-scale stationary power generation equipment, since the polymer electrolyte membrane fuel cell is operated at a lower temperature than the other fuel cells and the output density of the polymer electrolyte membrane fuel cell is high, whereby it is possible to miniaturize the polymer electrolyte membrane fuel cell.

One of the most important factors in improving the performance of the polymer electrolyte membrane fuel cell (PEMFC) is to supply a predetermined amount or more of moisture to a polymer electrolyte membrane or a proton exchange membrane (PEM) of a membrane electrode assembly (MEA) in order to retain moisture content. The reason for this is that, if the polymer electrolyte membrane or the proton exchange membrane is dried, power generation efficiency is abruptly reduced.

1) A bubbler humidification method of filling a pressure-resistant container with water and allowing a target gas to pass through a diffuser in order to supply moisture, 2) a direct injection method of calculating the amount of moisture to be supplied that is necessary for fuel cell reaction and directly supplying moisture to a gas stream pipe through a solenoid valve, and 3) a membrane humidification method of supplying moisture to a gas fluid bed using a polymer separation membrane are used as methods of humidifying the polymer electrolyte membrane or the proton exchange membrane.

Among these methods, the membrane humidification method, which provides water vapor to gas (i.e. air or fuel gas) that is supplied to the polymer electrolyte membrane or the proton exchange membrane using a membrane configured to selectively transmit only water vapor included in off-gas in order to humidify the polymer electrolyte membrane or the proton exchange membrane, is advantageous in that it is possible to reduce the weight and size of a humidifier.

When a module is formed, a hollow fiber membrane having large transmission area per unit volume is suitable for a permselective membrane used in the membrane humidification method. That is, when a humidifier is manufactured using a hollow fiber membrane, high integration of the hollow fiber membrane having large contact surface area is possible, whereby it is possible to sufficiently humidify the polymer electrolyte membrane or the proton exchange membrane even at a small capacity, it is possible to use a low-priced material, and it is possible to collect moisture and heat included in off-gas discharged from the fuel cell at a high temperature and to reuse the collected moisture and heat through the humidifier.

As illustrated in FIG. 1, a conventional membrane humidification type humidifier 1000 includes a humidifying module 1100 in which moisture exchange is performed between gas supplied from the outside and off-gas discharged from a fuel cell stack (not shown), and caps 1200 coupled respectively to opposite ends of the humidifying module 1100.

One of the caps 1200 transmits gas supplied from the outside to the humidifying module 1100, and the other cap transmits gas humidified by the humidifying module 1100 to the fuel cell stack.

The humidifying module 1100 includes a mid-case 1110 having an off-gas inlet 1110*a* and an off-gas outlet 1110*b* and a plurality of hollow fiber membranes 1120 disposed in the mid-case 1110. Opposite ends of a bundle of hollow fiber membranes 1120 are potted in fixing layers 1130. In general, each of the fixing layers 1130 is formed by hardening a liquid polymer, such as liquid polyurethane resin, using a casting method (e.g. dip casting, which is also called dip potting, or centrifugal casting, which is also called centrifugal potting).

Gas supplied from the outside flows along hollow parts of the hollow fiber membranes 1120. Off-gas introduced into the mid-case 111 through the off-gas inlet 1110*a* comes into contact with the outer surfaces of the hollow fiber membranes 1120, and is discharged from the mid-case 111 through the off-gas outlet 1110*b*. When the off-gas comes into contact with the outer surfaces of the hollow fiber membranes 1120, moisture contained in the off-gas is transmitted through the hollow fiber membranes 1120 to humidify gas flowing along the hollow parts of the hollow fiber membranes 1120.

Inner spaces of the caps 1200 must fluidly communicate with only the hollow parts of the hollow fiber membranes 1120 in a state of being completely isolated from an inner space of the mid-case 1110. If not, gas leakage due to pressure difference occurs, whereby power generation efficiency of a fuel cell is reduced.

In general, as illustrated in FIG. 1, the fixing layers 1130 and resin layers 1140 provided between the fixing layers 1130 and the mid-case 1110 isolate the inner spaces of the caps 1200 from the inner space of the mid-case 1110. Similarly to the fixing layers 1130, each of the resin layers 1140 is generally formed by hardening a liquid polymer, such as liquid polyurethane resin, using a casting method (dip casting or centrifugal casting).

However, (i) the resin layer 1140 is alternately expanded and contracted as a result of repeated operation and stop of the fuel cell, whereby the resin layer 1140 is separated from the mid-case 1110 due to a difference in coefficient of thermal expansion between the mid-case 1110 and the resin layer 1140, and therefore a gap is generated therebetween, or (ii) there is a high probability of a gap being generated between the resin layer 1140 and the mid-case 1110 due to vibration and/or impact. The gap between the resin layer 1140 and the mid-case 1110 causes gas leakage, thereby reducing power generation efficiency of the fuel cell.

In order to prevent gas leakage due to generation of the gap between the resin layer 1140 and the mid-case 1110, Korean Registered Patent No. 1697998 discloses a method of applying a sealant (liquid sealing member) to a step formed on the side surface of the resin layer 1140 and a groove formed in the inner surface of the mid-case 1110, inserting a packing member (solid sealing member) into the groove, and hardening the sealant.

However, the above method has problems of low productivity and high manufacturing cost in that (i) the sealant must be applied so as to accurately match with the groove, whereby workability is low, (ii) a considerably long time of 24 hours or more is required to harden the sealant, and (iii) a separate space for storing the humidifying module 1100 is required until the sealant is hardened.

DISCLOSURE

Technical Problem

Therefore, the present disclosure relates to a humidifier for a fuel cell capable of preventing problems caused by limitations and shortcomings of the related art described above and a method of manufacturing the same.

It is an object of the present disclosure to provide a humidifier for a fuel cell capable of certainly preventing gas leakage due to repeated operation and stop of a fuel cell and being manufactured with relatively low manufacturing cost and high productivity.

It is another object of the present disclosure to provide a method of manufacturing a humidifier for a fuel cell capable of certainly preventing gas leakage due to repeated operation and stop of a fuel cell with relatively low manufacturing cost and high productivity.

In addition to the above objects, other features and advantages of the present disclosure will be described hereinafter, or will be clearly understood by those skilled in the art to which the present disclosure pertains from the following description thereof.

Technical Solution

In accordance with an aspect of the present disclosure, there is provided a humidifier for a fuel cell, the humidifier including a humidifying module configured to humidify gas supplied from outside using moisture in off-gas discharged from a fuel cell stack and caps coupled respectively to opposite ends of the humidifying module, wherein the humidifying module includes a mid-case open at opposite ends thereof, the mid-case having a step at the inner circumferential surface thereof, a plurality of hollow fiber membranes disposed in the mid-case, a fixing layer in which ends of the hollow fiber membranes are potted, a bracket supported by the step of the mid-case, the bracket being in contact with the fixing layer, and a packing member having a groove into which the end of the mid-case is inserted, the packing member being in contact with the bracket.

The humidifying module may further include a primer layer disposed between the bracket and the fixing layer or between the bracket and the packing member, and the bracket may be disposed in indirect contact with the fixing member or the packing member via the primer layer.

The primer layer may include a rubber adhesive component, an acrylic adhesive component, a polyurethane adhesive component, an epoxy adhesive component, a silicone adhesive component, a polyamide-based adhesive component, a polyimide-based adhesive component, or a mixture of two or more thereof.

Each of the bracket and the packing member may have a simple closed curve shape corresponding to the shape of a traverse section of the mid-case.

The bracket may have higher hardness than the packing member.

For example, the bracket may have a hardness of 60 to 100 Shore A, and the packing member may have a hardness of 30 to 60 Shore A.

The packing member may include soft rubber, and the bracket may include metal, rigid plastic, or hard rubber.

The packing member may include silicone rubber or urethane rubber, and the bracket may include polypropylene (PP), polyethylene terephthalate (PET), polystyrene (PS), polycarbonate (PC), or acrylic resin.

The packing member may be in contact also with the fixing layer.

The fixing layer may include a first fixing layer in which the ends of the hollow fiber membranes are potted, and a second fixing layer in contact with the bracket, the second fixing layer surrounding the first fixing layer.

The first fixing layer and the second fixing layer may be formed of the same material.

Both the first fixing layer and the second fixing layer may include polyurethane (PU) resin.

The humidifying module may further include an inner case disposed in the mid-case, the inner case being open at opposite ends thereof, and the hollow fiber membranes may be disposed in the inner case.

The end of the inner case may be potted in the first fixing layer.

The hollow fiber membranes may include a first group of hollow fiber membranes and a second group of hollow fiber membranes, the humidifying module may further include a first inner case in which the first group of hollow fiber membranes is disposed and a second inner case in which the second group of hollow fiber membranes is disposed, and the fixing layer may include a first fixing layer in which ends of the first group of hollow fiber membranes are potted, a second fixing layer in which ends of the second group of hollow fiber membranes are potted, and a third fixing layer in contact with the bracket, the third fixing layer surrounding the first and second fixing layers.

An end of the first inner case may be potted in the first fixing layer, and an end of the second inner case is potted in the second fixing layer.

In accordance with another aspect of the present disclosure, there is provided a method of manufacturing a humidifier for a fuel cell, the method including preparing a hollow fiber membrane cartridge having a first fixing layer in which ends of a plurality of hollow fiber membranes are potted, inserting the hollow fiber membrane cartridge into a mid-case open at opposite ends thereof, the mid-case having a step at the inner circumferential surface thereof, mounting a bracket on the step of the mid-case, mounting a packing member having a groove corresponding to the end of the mid-case on the end of the mid-case such that the end of the mid-case is inserted into the groove and a portion of the packing member comes into contact with the bracket, forming a second fixing layer configured to fill a gap between the mid-case and an end of the hollow fiber membrane cartridge, a gap between the bracket and the end of the hollow fiber membrane cartridge, and a gap between the packing member and the end of the hollow fiber membrane cartridge, simultaneously cutting the first fixing layer, the second fixing layer, and the hollow fiber membranes to open the ends of the hollow fiber membranes, and fastening a cap to the mid-case such that the packing member is compressed by the cap.

The preparing the hollow fiber membrane cartridge may include inserting at least a portion of each of the hollow fiber membranes into an inner case and performing a dip casting process or a centrifugal casting process to form the first fixing layer.

An end of the inner case may also be potted in the first fixing layer together with the ends of the hollow fiber membranes when the dip casting process or the centrifugal casting process is performed.

The bracket may have higher hardness than the packing member such that the packing member is compressed when the cap is fastened to the mid-case.

The general description of the present disclosure given above is provided merely to illustrate or describe the present disclosure, and does not limit the scope of rights of the present disclosure.

Advantageous Effects

According to the present disclosure, workability is improved and manufacturing time is reduced, whereby it is possible to remarkably improve productivity thereof, since a sealant application process and a sealant hardening process, which are required in the conventional art, are omitted.

In addition, a separate space for storing a half-finished product for the sealant hardening process is not required, whereby it is possible to reduce production cost of a humidifier.

DESCRIPTION OF DRAWINGS

The accompanying drawings, which are included to assist in understanding of the present disclosure and are incorporated in and constitute a part of the present specification, illustrate embodiments of the present disclosure and serve to explain the principle of the present disclosure together with the detailed description of the present disclosure.

FIG. 3(*b*) is a sectional view taken along line A-A of FIG. 3(*a*);

FIG. 4(*b*) is a sectional view taken along line A-A of FIG. 4(*a*);

BEST MODE

Hereinafter, embodiments of the present disclosure will be described in detail with reference to the accompanying drawings. However, the following embodiments are illustratively provided merely for clear understanding of the present disclosure and do not limit the scope of the present disclosure.

FIGS. 2 and 5 to 7G are sectional views showing an end of a humidifier or a half-finished product, and the other end thereof has a substantially identical (or symmetrical) section.

Figure 1:
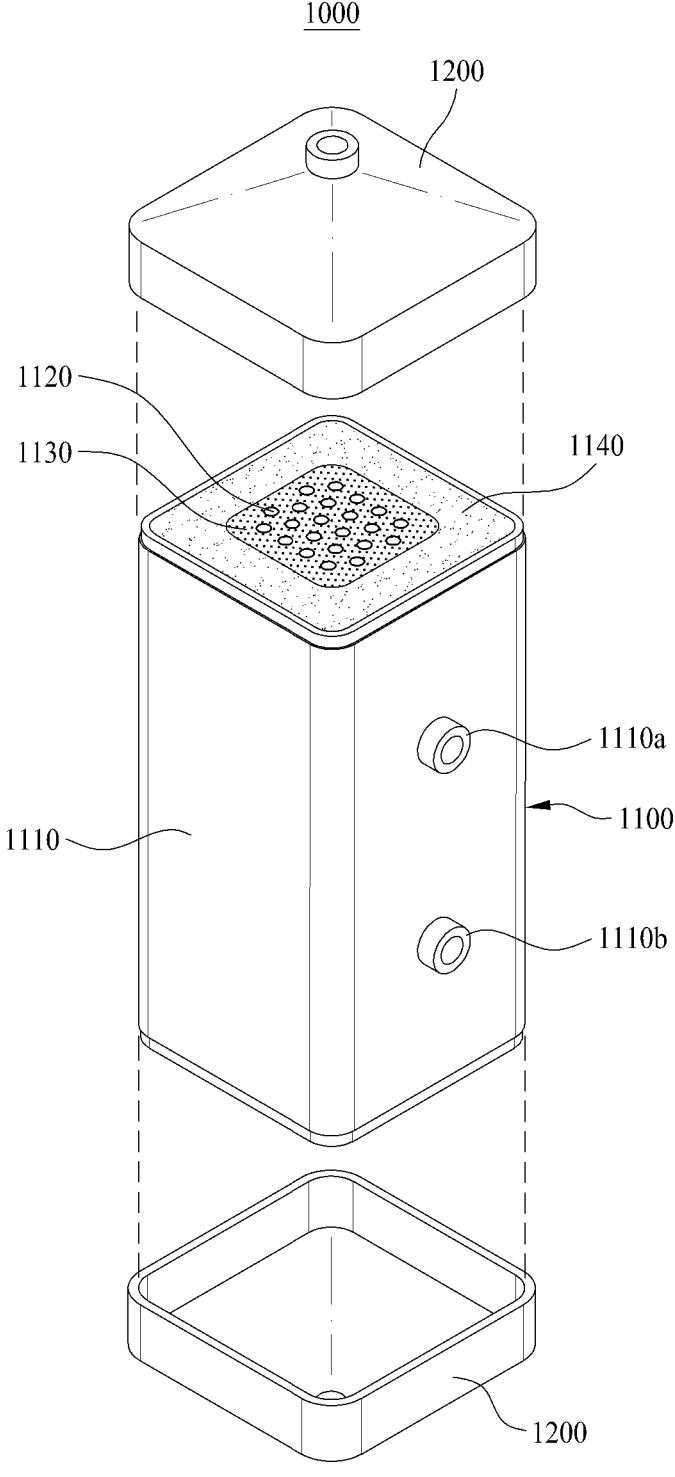
FIG. 1 is an exploded perspective view schematically showing a conventional humidifier for a fuel cell.
Figure 2:
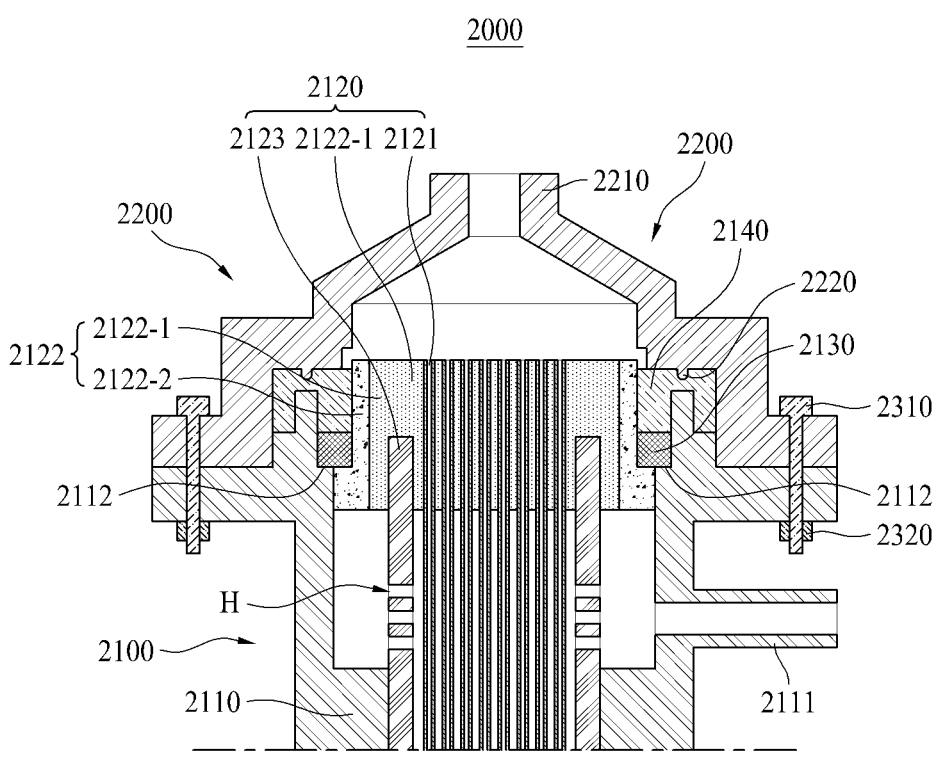
FIG. 2 is a sectional view showing a humidifier according to a first embodiment of the present disclosure.

As illustrated in FIG. 2, a humidifier 2000 for a fuel cell according to the present disclosure includes a humidifying module 2100 configured to humidify gas supplied from the outside using moisture in off-gas discharged from a fuel cell stack. Opposite ends of the humidifying module 2100 are coupled to caps 2200, respectively.

One of the caps 2200 receives gas from the outside through a port 2210 and transmits the gas to the humidifying module 2100, and the other cap transmits gas humidified by the humidifying module 2100 to the fuel cell stack through a port 2210. Each of the caps 2200 may be formed of rigid plastic (e.g. polycarbonate, polyamide (PA), or polyphthalamide (PPA)) or metal, and may have a simple closed curve-shaped (e.g. circular or polygonal) traverse section.

The humidifying module 2100 according to the embodiment of the present disclosure, in which moisture exchange is performed between gas supplied from the outside and off-gas supplied from the fuel cell stack, includes a mid-case 2110 open at opposite ends thereof, the mid-case having a step 2112 formed at the inner circumferential surface thereof, a plurality of hollow fiber membranes 2121 disposed in the mid-case 2110, a fixing layer 2122 in which ends of the hollow fiber membranes 2121 are potted, a bracket 2130 supported by the step 2112 of the mid-case 2110, the bracket being in contact with the fixing layer 2122, and a packing member 2140 having a groove into which the end of the mid-case 2110 is inserted, the packing member being in contact with the bracket 2130.

The mid-case 2110 has ports 2111 for off-gas introduction/discharge (only one is shown in FIG. 2). The mid-case 2110 may be formed of rigid plastic (e.g. polycarbonate, polyamide (PA), or polyphthalamide (PPA)) or metal, and may have a simple closed curve-shaped (e.g. circular or polygonal) traverse section. According to the embodiment of the present disclosure, the mid-case 2110 may have the same traverse section as the cap 2200.

Each of the hollow fiber membranes 2121 may include a polymer membrane formed of polysulfone resin, polyethersulfone resin, sulfonated polysulfone resin, polyvinylidene fluoride (PVDF) resin, polyacrylonitrile (PAN) resin, polyimide resin, polyamide imide resin, polyester imide resin, or a mixture of two or more thereof.

Gas supplied from the outside through one cap 2200 is humidified while flowing along hollow parts of the hollow fiber membranes 2121, and is transmitted to the fuel cell stack through the other cap 2200.

Off-gas introduced into the mid-case 2110 comes into contact with the outer surfaces of the hollow fiber membranes 2121, and is discharged from the mid-case 211. When the off-gas comes into contact with the outer surfaces of the hollow fiber membranes 2121, moisture contained in the off-gas is transmitted through the hollow fiber membranes 2121 to humidify gas flowing along the hollow parts of the hollow fiber membranes 2121.

The fixing layer 2122 which may be formed of hard or soft polyurethane resin must isolate the inner space of the cap 2200 from the inner space of the mid-case 2110 such that the cap 2200 can fluidly communicate only with the hollow fiber membranes 2121.

As previously described, however, (i) the fixing layer 2122 is alternately expanded and contracted as a result of repeated operation and stop of a fuel cell, whereby the fixing layer 2122 is separated from the mid-case 2110 due to a difference in coefficient of thermal expansion between the mid-case 2110 and the fixing layer 2122, and therefore a gap is generated therebetween, or (ii) there is a high probability of a gap being generated between the fixing layer 2122 and the mid-case 2110 due to vibration and/or impact. The gap between the fixing layer 2122 and the mid-case 2110 causes gas leakage, thereby reducing power generation efficiency of the fuel cell.

Gas leakage that may be caused by generation of the gap between the fixing layer 2122 and the mid-case 2110 includes (i) external leakage by which off-gas in the inner space of the mid-case 2110 sequentially passes through the gap between the fixing layer 2122 and the mid-case 2110 and the gap between the cap 2200 and the mid-case 2110 and is then discharged out of the humidifier 2000 and (ii) internal leakage by which off-gas in the inner space of the mid-case 2110 sequentially passes through the gap between the fixing layer 2122 and the mid-case 2110 and the gap between the fixing layer 2122 and the cap 2200 and is then introduced into the inner space of the cap 2200.

In order to prevent gas leakage due to generation of the gap between the fixing layer 2122 and the mid-case 2110, the humidifying module 2100 of the humidifier 2000 for a fuel cell according to the present disclosure further includes the bracket 2130 and the packing member 2140.

Figure 3:
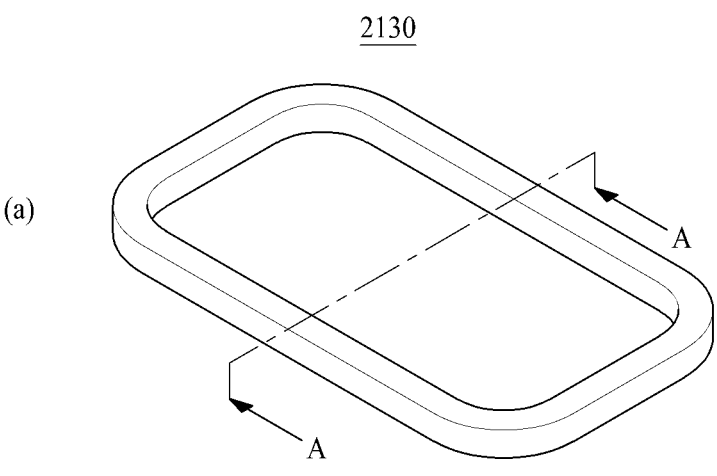
FIG. 3(*a*) is a perspective view of a bracket according to an embodiment of the present disclosure.
Figure 3:

As illustrated in FIG. 3, the bracket 2130, which is supported by the step 2112 of the mid-case 2110, may have a simple closed curve shape corresponding to the shape of the traverse section of the mid-case 2110.

Figure 4:
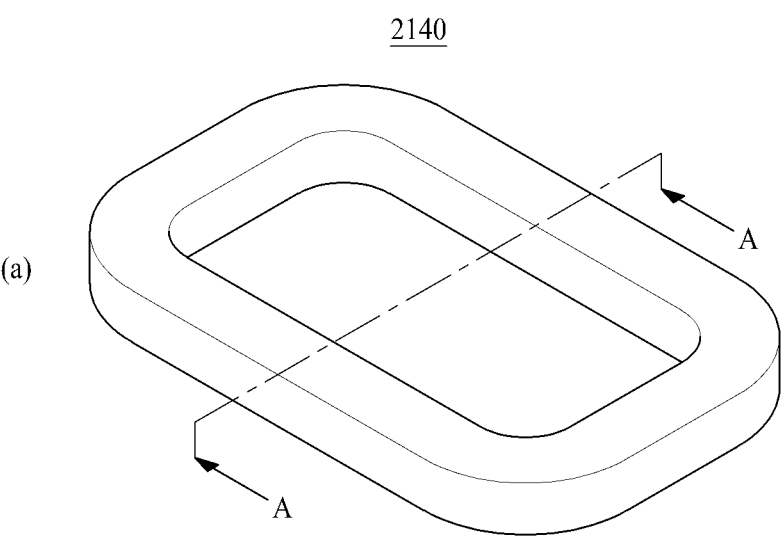
FIG. 4(*a*) is a perspective view of a packing member according to an embodiment of the present disclosure.
Figure 4:
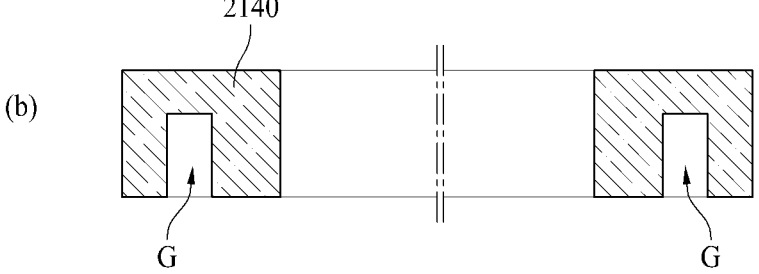

Similarly, as illustrated in FIG. 4, the packing member 2140 having the groove G into which the end of the mid-case 2110 is inserted may also have a simple closed curve shape corresponding to the shape of the traverse section of the mid-case 2110.

According to the embodiment of the present disclosure, the bracket 2130 has higher hardness than the packing member 2140 and is strongly adhered to the fixing layer 2122.

For example, the packing member 2140 may have a relatively low hardness of 30 to 60 Shore A, more preferably 40 to 50 Shore A, so as to be compressed by pressure applied when the cap 2200 is fastened to the mid-case 2110 through a bolt 2310 and a nut 2320, and the bracket 2130 may have a hardness of 60 to 100 Shore A, more preferably 70 to 100 Shore A, which is higher than the hardness of the packing member 2140.

According to the embodiment of the present disclosure, the packing member 2140 may include soft rubber (e.g. silicone rubber or urethane rubber), and the bracket 2130 may include metal, rigid plastic (e.g. polypropylene (PP), polyethylene terephthalate (PET), polystyrene (PS), polycarbonate (PC), or acrylic resin), or hard rubber.

When the cap 2200 is fastened to the mid-case 2110 through the bolt 2310 and the nut 2320, the portion of the packing member 2140 disposed between the cap 2200 and the mid-case 2110 (particularly, the portion of the packing member 2140 corresponding to the groove into which the end of the mid-case 2110 is inserted) is compressed by pressure applied by the cap 2200 and the mid-case 2110, whereby movement of gas through the interface between the packing member 2140 and the mid-case 2110 (i.e. external leakage) can be prevented, and therefore tight external sealing may be guaranteed.

In addition, since the bracket 2130 is supported by the step 2112 of the mid-case 2110 and has relatively high hardness, the bracket 2130 may effectively apply pressure to the packing member 2140 together with the cap 2200 when the cap 2200 is fastened to the mid-case 2110 through the bolt 2310 and the nut 2320. As a result, the portion of the packing member 2140 disposed between the cap 2200 and the bracket 2130 (i.e. located in the mid-case 2110) is sufficiently compressed, whereby movement of gas through the interface between the packing member 2140 and the bracket 2130 (i.e. internal leakage) can be prevented, and therefore excellent internal sealing may be guaranteed.

In addition, since the bracket 2130 according to the embodiment of the present disclosure has excellent adhesive force with respect to the fixing layer 2122, movement of gas through the interface between the bracket 2130 and the fixing layer 2122 (i.e. internal leakage) can be prevented, and therefore stronger internal sealing may be provided.

Figure 5:
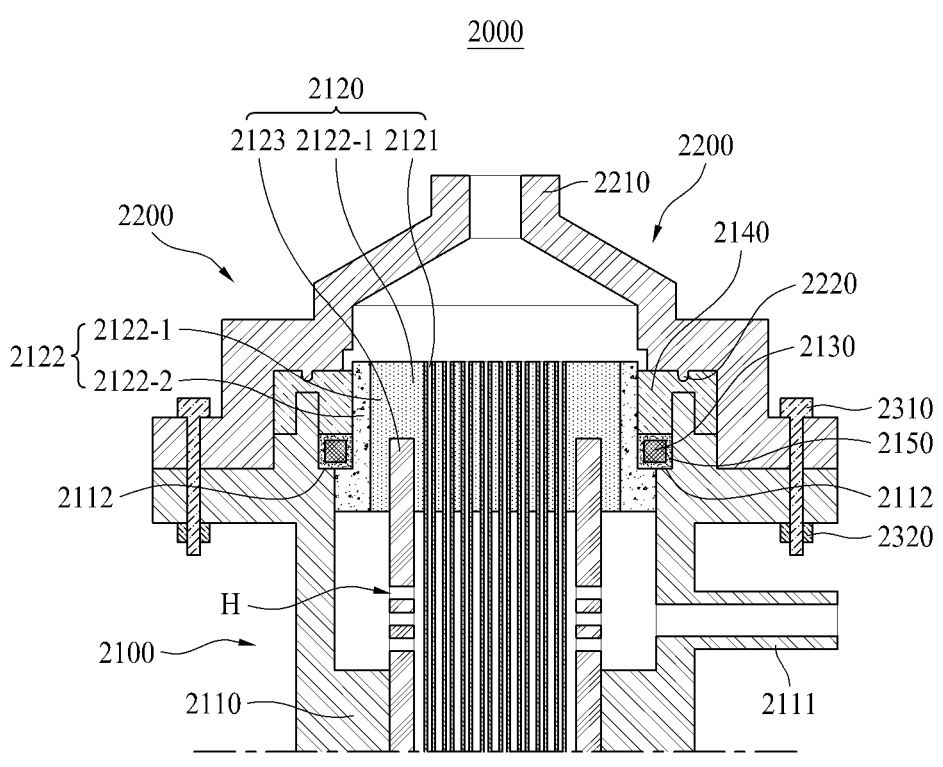
FIG. 5 is a sectional view showing the humidifier to which a primer layer is applied.

Optionally, as shown in FIG. 5, the humidifying module 2100 according to the embodiment of the present disclosure may further include a primer layer 2150 formed on at least a portion of the surface of the bracket 2130.

FIG. 5 illustrates the humidifier 2000 having the primer layer 2150 formed on the entire surface of the bracket 2130; however, the present disclosure is not limited thereto. The primer layer 2150 may be disposed (i) between the bracket 2130 and the mid-case 2110, (ii) between the bracket 2130 and the fixing layer 2122, and/or (iii) between the bracket 2130 and the packing member 2140.

When the bracket 2130 is in indirect contact with the mid-case 2110 and/or the packing member 2140 via the primer layer 2150, the adhesive force therebetween is increased, whereby movement of gas through the interface therebetween (i.e. internal leakage and external leakage) can be prevented, and therefore stronger internal and external sealing can be provided.

Similarly, when the bracket 2130 is in indirect contact with the fixing layer 2122 via the primer layer 2150, the adhesive force therebetween is further increased, whereby an internal sealing effect can be maximized.

The primer layer 2150 according to the present disclosure adopted to improve the sealing effect through an increase in adhesive force may include a rubber adhesive component, an acrylic adhesive component, a polyurethane adhesive component, an epoxy adhesive component, a silicone adhesive component, a polyamide-based adhesive component, a polyimide-based adhesive component, or a mixture of two or more thereof.

For the rubber adhesive component, natural rubber (NR) and/or synthetic rubber may be used. The synthetic rubber may be SBR, NBR, CR, BR, IIR, and/or EPDM.

For the acrylic adhesive component, acrylic emulsion, anaerobic acrylic resin, and/or acrylic resin-based adhesive tape may be used.

For the polyurethane adhesive component, solvent-type polyurethane, polyurethane hot melt, or urethane emulsion may be used.

For the polyamide-based adhesive component, polyamide hot melt may be used.

As illustrated in FIGS. 2 and 5, the cap 2200 according to the embodiment of the present disclosure may have a protrusion 2220 formed at a position corresponding to the end of the mid-case 2110 inserted into the groove G of the packing member 2140. The protrusion 2220 more effectively compresses the packing member 2140 together with the end of the mid-case 2110, whereby tighter external sealing is achieved.

As illustrated in FIGS. 2 and 5, the packing member 2140 according to the embodiment of the present disclosure may be in contact with the fixing layer 2122. Liquid resin (e.g. liquid polyurethane resin) used to form the fixing layer 2122 is hardened in a state of being in contact with the packing member 2140, whereby adhesive strength between the packing member 2140 and the fixing layer 2122 may be increased and thus internal sealing may be improved.

According to the embodiment of the present disclosure, as illustrated in FIGS. 2 and 5, the fixing layer 2122 may include a first fixing layer 2122-1 in which the ends of the hollow fiber membranes 2121 are potted, and a second fixing layer 2122-2 in contact with the bracket 2130, the a second fixing layer 2122-2 surrounding the first fixing layer 2122-1.

Each of the first fixing layer 2122-1 and the second fixing layer 2122-2 may be formed by hardening liquid resin, such as liquid polyurethane resin, using a dip casting method or a centrifugal casting method. Although the first fixing layer 2122-1 and the second fixing layer 2122-2 may be formed of different materials, it may be preferable for the first fixing layer and the second fixing layer to be formed of the same material (e.g. polyurethane resin) in terms of adhesive strength therebetween.

As illustrated in FIGS. 2 and 5, the humidifying module 2100 may further include an inner case 2123 disposed in the mid-case 2110, the inner case being open at opposite ends thereof. In this case, the hollow fiber membranes 2121 are disposed in the inner case 2123. The first fixing layer 2122-1 in which ends of the hollow fiber membranes 2121 are potted closes a corresponding one of the open ends of the inner case 2123.

According to the embodiment of the present disclosure, the inner case 2123 has a plurality of holes H provided at positions corresponding to the ports 2111 for off-gas introduction/discharge (only one is shown in FIG. 2). Off-gas introduced into the mid-case 2110 through the first port 2111 passes through the first holes H and then absorbs moisture while flowing along the outer surfaces of the hollow fiber membranes 2121. Subsequently, the off-gas exits the inner case 2123 through the second holes H on the opposite side and is then discharged from the mid-case 2110 through the second port 2111.

The hollow fiber membranes 2121, the first fixing layer 2122-1, and the inner case 2123 constitute a hollow fiber membrane cartridge 2120.

As illustrated in FIGS. 2 and 5, an end of the inner case 2123 is potted in the first fixing layer 2122-1, whereby relative positions of the hollow fiber membranes 2121 and the inner case 2123 may be uniformly maintained.

Hereinafter, a humidifier 2000 for a fuel cell according to a second embodiment of the present disclosure will be described with reference to FIG. 6.

Figure 6:
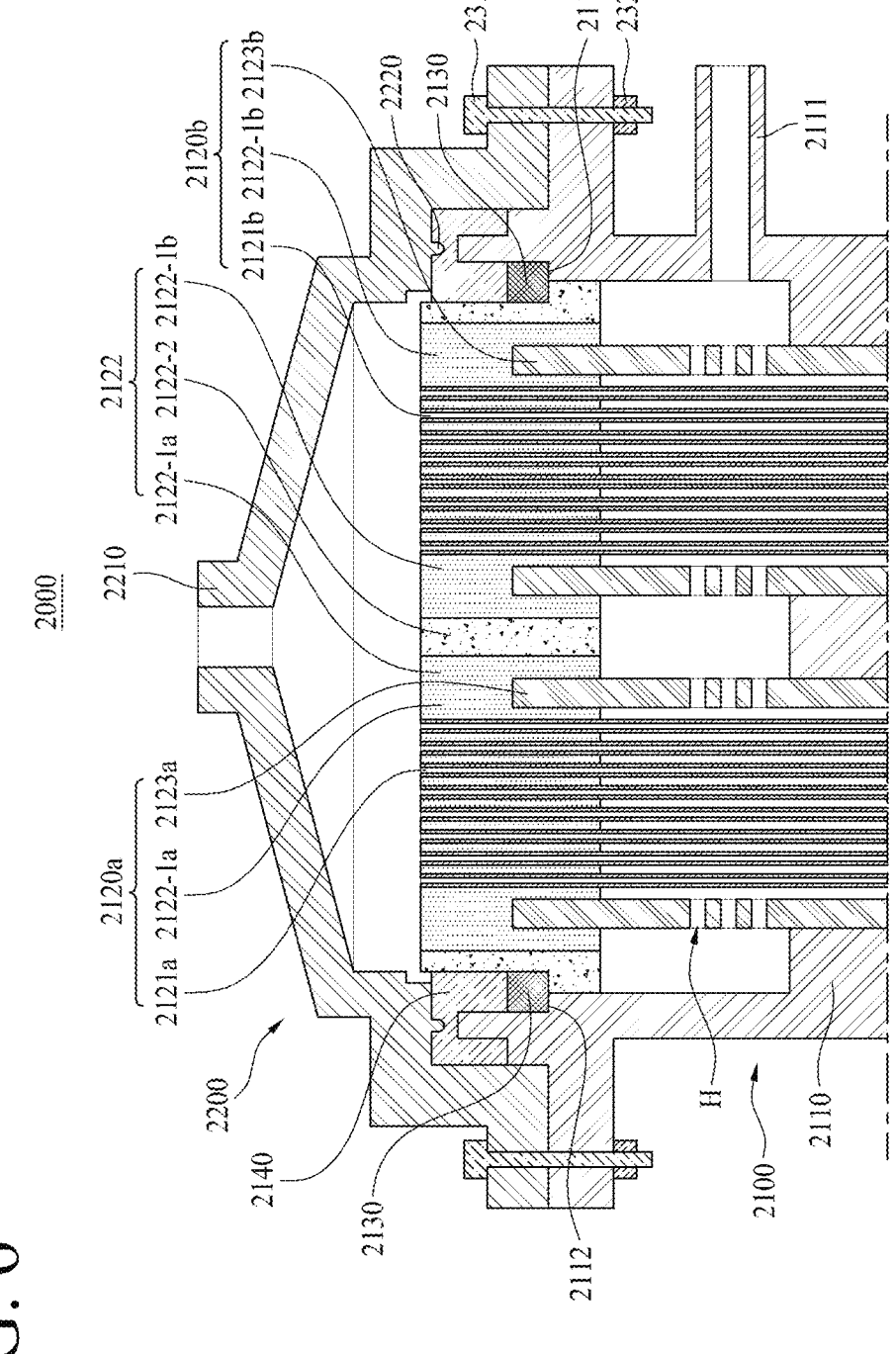
FIG. 6 is a sectional view showing a humidifier according to a second embodiment of the present disclosure.

As illustrated in FIG. 6, the humidifier 2000 for a fuel cell according to the second embodiment of the present disclosure is substantially identical to the first embodiment described above except that the humidifier includes two hollow fiber membrane cartridges 2120a and 2120b.

That is, according to the second embodiment of the present disclosure, the hollow fiber membranes include a first group of hollow fiber membranes 2121a and a second group of hollow fiber membranes 2121b, the humidifying module 2100 includes a first inner case 2123a in which the first group of hollow fiber membranes 2121a is disposed and a second inner case 2123b in which the second group of hollow fiber membranes 2121b is disposed, and the fixing layer 2122 includes a first fixing layer 2122-1a in which ends of the first group of hollow fiber membranes 2121a are potted, a second fixing layer 2122-1b in which ends of the second group of hollow fiber membranes 2121b are potted, and a third fixing layer 2122-2 in contact with the bracket 2130, the third fixing layer 2122-2 surrounding the first and second fixing layers 2122-1a and 2122-1b.

The first group of hollow fiber membranes 2121a, the first fixing layer 2122-1a, and the first inner case 2123a constitute a first hollow fiber membrane cartridge 2120a, and the second group of hollow fiber membranes 2121b, the second fixing layer 2122-1b, and the second inner case 2123b constitute a second hollow fiber membrane cartridge 2120b.

As illustrated in FIG. 6, ends of the first and second inner cases 2123a and 2123b are potted in the first and second fixing layers 2122-1a and 2122-1b, respectively, whereby relative positions of the first group of hollow fiber membranes 2121a and the first inner case 2123a and relative positions of the second group of hollow fiber membranes 2121b and the second inner case 2123b may be uniformly maintained.

In order to increase humidification capacity, the number of hollow fiber membranes 2121 must be increased. However, in the first embodiment, which includes only a single hollow fiber membrane cartridge 2120, there is a problem in that, if the number of hollow fiber membranes 2121 is increased, it is difficult for off-gas to be transmitted to hollow fiber membranes 2121 located at the center.

In the second embodiment of the present disclosure, by contrast, two hollow fiber membrane cartridges 2120a and 2120b are disposed spaced apart from each other, whereby, even though the number of hollow fiber membranes 2121a and 2121b is increased, off-gas may be relatively uniformly transmitted to the hollow fiber membranes 2121a and 2121b. That is, on the assumption that the number of hollow fiber membranes is uniform, the structure of the second embodiment, which includes two hollow fiber membrane cartridges 2120a and 2120b, is advantageous in terms of utilization of the hollow fiber membranes, compared to the structure of the first embodiment, which includes a single hollow fiber membrane cartridge 2120.

The number of hollow fiber membrane cartridge(s) mounted in the mid-case 2110 may be determined in overall consideration of the capacity of the fuel cell (or required humidification capacity), the size of the humidifier, and the weight of the humidifier.

Hereinafter, a method of manufacturing a humidifier 2000 for a fuel cell according to an embodiment of the present disclosure will be described in more detail with reference to FIGS. 7A to 7G.

Figure 7A:
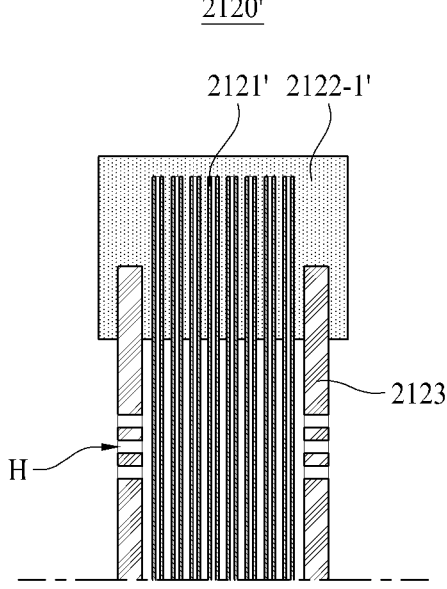
FIGS. 7A to 7G are sectional views explaining a humidifier manufacturing method according to an embodiment of the present disclosure.

First, as illustrated in FIG. 7A, a hollow fiber membrane cartridge 2120' having a first fixing layer 2122-1' in which ends of a plurality of hollow fiber membranes 2121' are potted is prepared.

The hollow fiber membrane cartridge 2120' may be manufactured by inserting at least a portion of each of the hollow fiber membranes 2121' into an inner case 2123 and performing a dip casting process or a centrifugal casting process using liquid resin, such as liquid polyurethane resin. The first fixing layer 2122-1' in which the ends of the hollow fiber membranes 2121' are potted is formed as a result of hardening of the liquid resin.

When the dip casting process or the centrifugal casting process is performed, an end of the inner case 2123 may be potted in the first fixing layer 2122-1' together with the ends of the hollow fiber membranes 2121'.

Figure 7B:
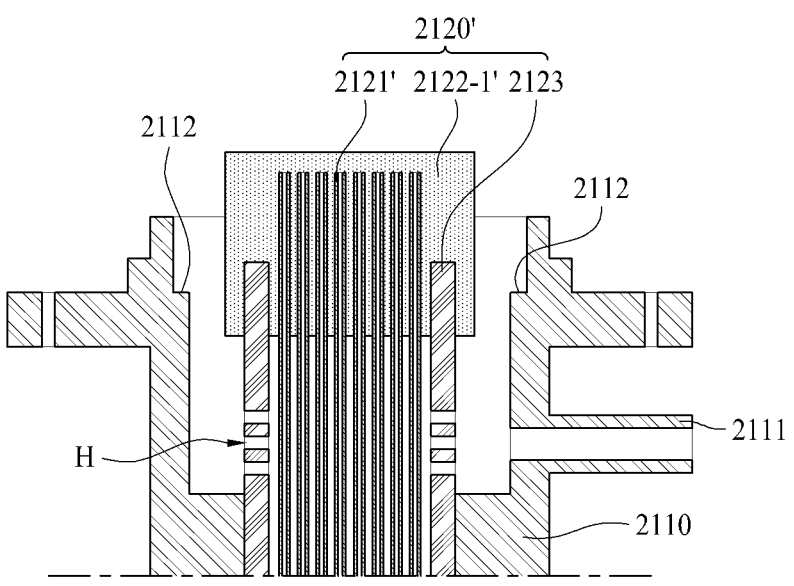

The inner case 2123 may have first and second groups of holes H formed in a longitudinal direction thereof so as to be located on opposite sides. 107[ ] Subsequently, as illustrated in FIG. 7B, the hollow fiber membrane cartridge 2120' is inserted into a mid-case 2110 open at opposite ends thereof and having a step 2122 formed at the inner circumferential surface thereof. 108[ ] According to the embodiment of the present disclosure, the mid-case 2110 has open ends, and has a simple closed curve-shaped traverse section. The mid-case 2110 may have a partition wall configured to divide an inner space thereof into an off-gas introduction space and an off-gas discharge space located on opposite sides in a longitudinal direction, and the hollow fiber membrane cartridge 2120' may be inserted through a hole formed in the partition wall so as to be supported by the partition wall. At this time, the first group of holes H of the inner case 2123 is located in the off-gas introduction space, and the second group of holes H of the inner case 2123 is located in the off-gas discharge space.

In this case, off-gas that has entered the off-gas introduction space is introduced into the inner case 2123 through the first group of holes H, flows toward the second group of holes H in the inner case 2123, moves to the off-gas discharge space through the second group of holes H, and is discharged from the mid-case 2110.

Figure 7C:
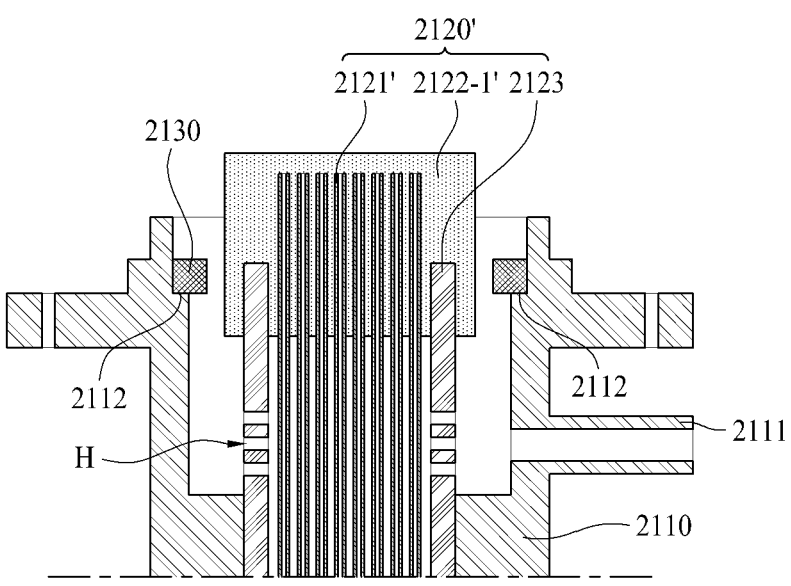

Subsequently, as shown in FIG. 7C, a bracket 2130 is mounted on the step 2112 of the mid-case 2110. As previously described, the mid-case 2110 has a simple closed curve-shaped traverse section, and the bracket 2130 may have a simple closed curve shape corresponding to the shape of the traverse section of the mid-case 2110.

The bracket 2130 according to the embodiment of the present invention may be formed of metal, rigid plastic (e.g. polypropylene (PP), polyethylene terephthalate (PET), polystyrene (PS), polycarbonate (PC), or acrylic resin), or hard rubber.

Optionally, in order to form the primer layer 2150, at least a portion of the surface of the bracket 2130 may be treated with a primer and may then be mounted on the step 2112 of the mid-case 2110, or the bracket 2130 may be mounted on the step 2112 of the mid-case 2110 and then the exposed surface thereof may be treated with a primer. As previously described, the primer may include a rubber adhesive component, an acrylic adhesive component, a polyurethane adhesive component, an epoxy adhesive component, a silicone adhesive component, a polyamide-based adhesive component, a polyimide-based adhesive component, or a mixture of two or more thereof.

Figure 7D:
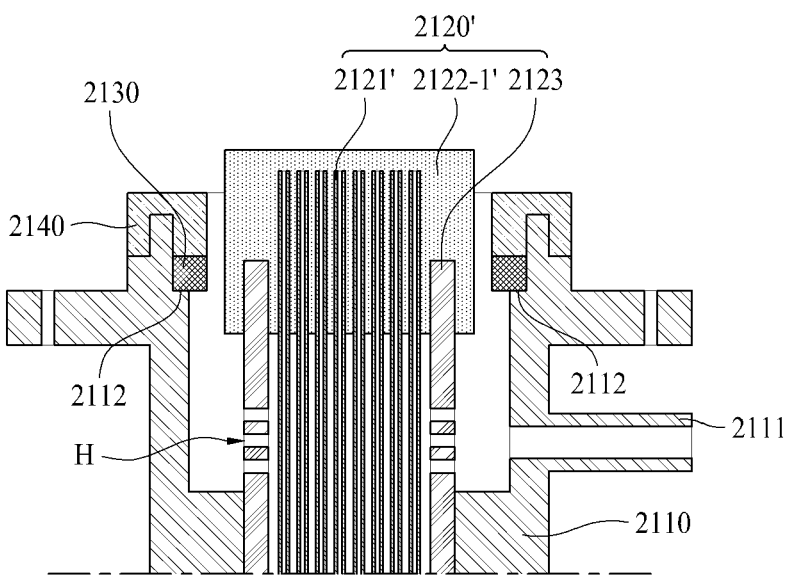

Subsequently, as illustrated in FIG. 7D, a packing member 2140 having a groove corresponding to the end of the mid-case 2110 is mounted on the end of the mid-case 2110 such that the end of the mid-case 2110 is inserted into the groove and a portion of the packing member 2140 comes into contact with the bracket 2130.

The packing member 2140 may also have a simple closed curve shape corresponding to the shape of the traverse section of the mid-case 2110.

Optionally, in order to provide stronger internal and external sealing by forming the primer layer (i) between the packing member 2140 and the mid-case 2110, (ii) between the packing member 2140 and a fixing layer 2122, and/or (iii) between the packing member 2140 and a cap 2200, at least a portion of the surface of the packing member 2140 may be treated with the primer and may then be mounted on the end of the mid-case 2110.

Figure 7E:
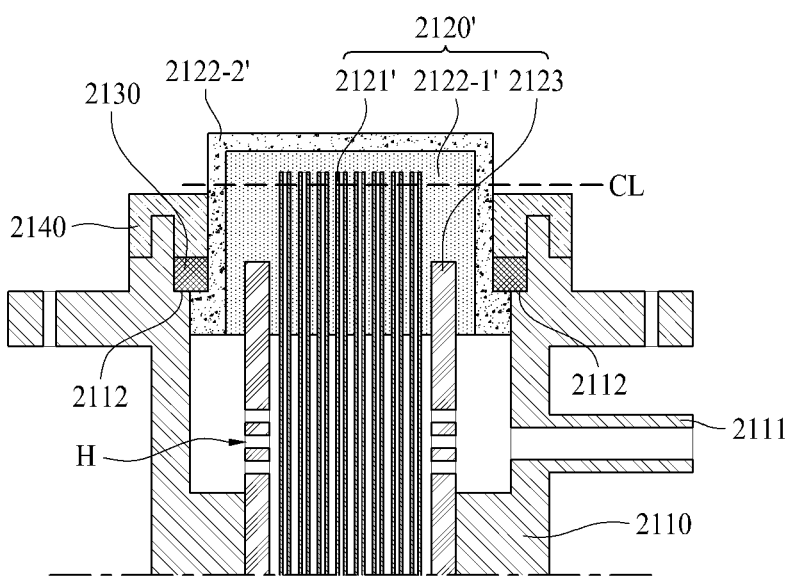

Subsequently, as shown in FIG. 7E, a second fixing layer 2122-2' configured to fill the gap between the mid-case 2110 and the end of the hollow fiber membrane cartridge 2120', the gap between the bracket 2130 and the end of the hollow fiber membrane cartridge 2120', and the gap between the packing member 2140 and the end of the hollow fiber membrane cartridge 2120' is formed.

The second fixing layer 2122-2' may be manufactured by fastening a potting cap (not shown) to the mid-case 2110, performing a dip casting process of injecting liquid resin, such as liquid polyurethane resin, into the potting cap and hardening the liquid resin in the state in which the potting cap is located under the mid-case 2110, and removing the potting cap. Alternatively, the second fixing layer 2122-2' may be formed through a centrifugal casting process.

Although the first and second fixing layers 2122-1' and 2122-2' may be formed of different liquid resins, it may be preferable for the first and second fixing layers to be formed of the same material (e.g. liquid polyurethane resin) in terms of adhesive strength therebetween.

According to the embodiment of the present disclosure, liquid resin (e.g. liquid polyurethane resin) used to form the second fixing layer 2122-2' may be hardened while being in contact with the bracket 2130 and the packing member 2140, whereby the adhesive force of the second fixing layer 2122-2' with respect to them may be increased and thus internal sealing may be improved.

According to the embodiment of the present disclosure, since the bracket 2130 is formed of a material that has excellent adhesive force with respect to the second fixing layer 2122-2', movement of gas through the interface therebetween (i.e. internal leakage) can be prevented, and therefore stronger internal sealing may be provided. In addition, when the bracket 2130 surface-treated with the primer and/or the packing member treated with the primer is used, the adhesive strength between the bracket 2130 and the second fixing layer 2122-2' and/or between the packing member 2140 and the second fixing layer 2122-2' can be maximized, and therefore better internal sealing may be provided.

Figure 7F:
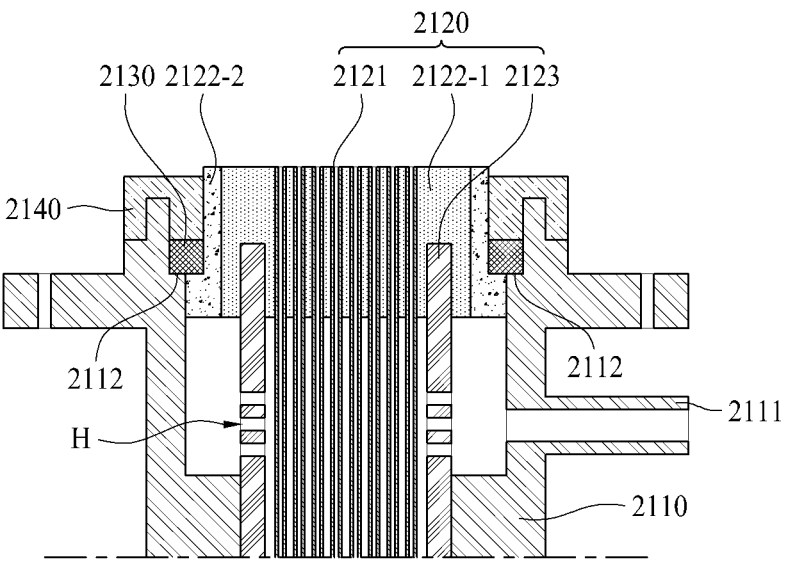

Subsequently, the first fixing layer 2122-1', the second fixing layer 2122-2', and the hollow fiber membranes 2121' are simultaneously cut along a cutting line CL of FIG. 7E, whereby hollow fiber membranes 2121 configured such that ends thereof potted in a first fixing layer 2122-1 surrounded by a second fixing layer 2122-2 are open are obtained, as illustrated in FIG. 7F.

Figure 7G:
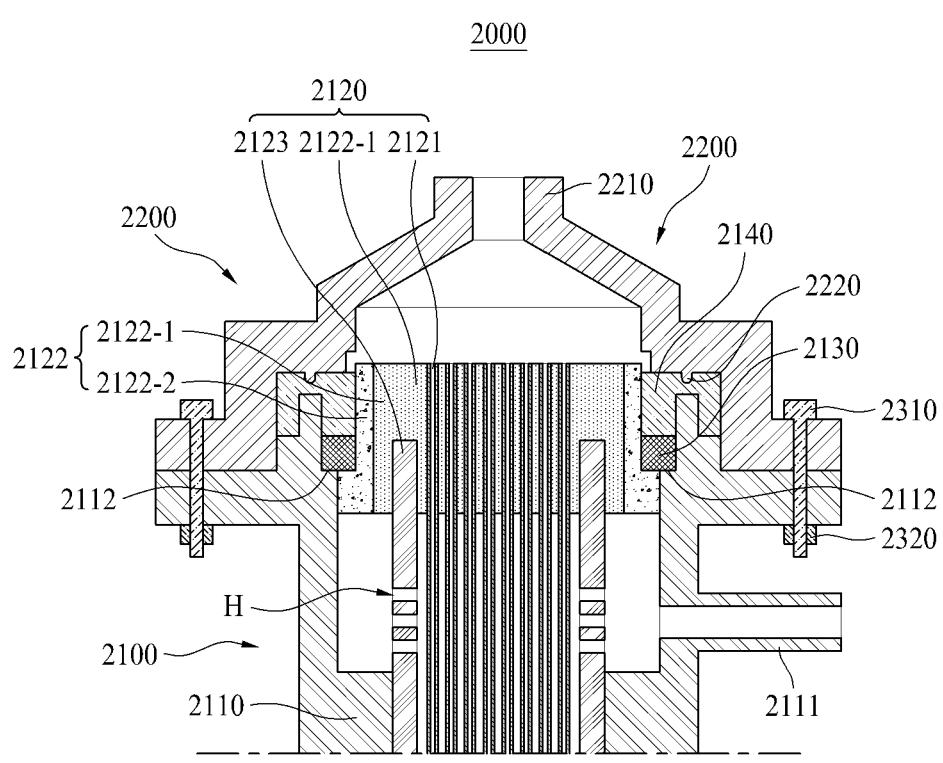

Subsequently, as illustrated in FIG. 7G, a cap 2200 is fastened to the mid-case 2110. Specifically, the cap 2200 is fastened to the mid-case such that the packing member 2140 is compressed by the cap 2200.

As illustrated in FIG. 7G, the cap 2200 according to the embodiment of the present disclosure may have a protrusion 2220 formed at a position corresponding to the end of the mid-case 2110, which is inserted into the groove of the packing member 2140. The protrusion 2220 more effectively compresses the packing member 2140 together with the end of the mid-case 2110, whereby tighter external sealing is achieved.

In addition, according to the embodiment of the present disclosure, the bracket 2130 has higher hardness than the packing member 2140, whereby the packing member 2140 may be compressed when the cap 2200 is fastened to the mid-case 2110.

That is, since the bracket 2130 is supported by the step 2112 of the mid-case 2110 and has hardness (60 to 100 Shore A, more preferably 70 to 100 Shore A) higher than the hardness of the packing member 2140 (30 to 60 Shore A, more preferably 40 to 50 Shore A), the bracket 2130 may effectively apply pressure to the packing member 2140 together with the cap 2200 when the cap 2200 is fastened to the mid-case 2110 through the bolt 2310 and the nut 2320. As a result, the portion of the packing member 2140 disposed between the cap 2200 and the bracket 2130 (i.e. located in the mid-case 2110) is sufficiently compressed, whereby movement of gas through the interface between the packing member 2140 and the bracket 2130 (i.e. internal leakage) can be prevented, and therefore excellent internal sealing may be guaranteed.

According to the present disclosure described above, it is possible to effectively prevent both the external leakage and the internal leakage only through mechanical assembly of the bracket 2130 and the packing member 2140 without conventional sealant application and hardening processes. According to the present disclosure, therefore, workability is improved and manufacturing time is reduced, whereby it is possible to remarkably improve productivity thereof, since the sealant application process and the sealant hardening process, which are required in the conventional art, are omitted. In addition, a separate space for storing a half-finished product during the sealant hardening process is not required, whereby it is possible to reduce production cost of the humidifier.

The invention claimed is:

1. A humidifier for a fuel cell, the humidifier comprising:
   a humidifying module configured to humidify gas supplied from outside using moisture in off-gas discharged from a fuel cell stack; and
   an upper cap and a lower cap, coupled respectively to an upper end and a lower end of the humidifying module, the upper cap including a protrusion,
   wherein the humidifying module comprises:
   a mid-case open at opposite ends thereof, the mid-case having an interior step at an inner circumferential surface thereof, the mid-case having a first port for off-gas introduction and a second port for off-gas discharge;
   a plurality of hollow fiber membranes disposed in the mid-case;
   a fixing layer in which ends of the hollow fiber membranes are potted, the fixing layer having an exterior step at an outer circumferential surface thereof;
   a bracket being in contact with the fixing layer, a portion of a bottom of the bracket being supported by the interior step at the inner circumferential surface of the mid-case and a remaining portion of the bottom of the bracket being supported by the exterior step at the outer circumferential surface of the fixing layer; and
   a packing member having a lower groove into which an end of the mid-case is inserted and an upper groove into which the protrusion of the upper cap is inserted,
   wherein the packing member being in contact with the bracket, and
   wherein the bracket has higher hardness than the packing member,
   wherein the humidifying module further comprises a first inner case which is separately provided from and inserted into the mid-case,
   wherein at least a portion of the hollow fiber membranes are disposed in the first inner case,
   wherein the mid-case has a partition wall configured to divide an inner space thereof into an off-gas introduction space corresponding to the first port and an off-gas discharge space corresponding to the second port,
   wherein the first inner case is inserted into the mid-case through a first hole formed in the partition wall so as to be supported by the partition wall,
   wherein the first inner case has a first group of holes located in the off-gas introduction space and a second group of holes located in the off-gas discharge space such that off-gas introduced into the first inner case from the off-gas introduction space through the first group of holes flows inside the first inner case and comes out to the off-gas discharge space through the second group of holes,
   wherein an end of the first inner case is potted in the fixing layer, and
   wherein the ends of the hollow fiber membranes protrude from the end of the first inner case such that the ends of the hollow fiber membranes potted in the fixing layer are open while the end of the first inner case potted in the fixing layer is entirely within the fixing layer.

2. The humidifier according to claim 1, wherein the humidifying module further comprises a primer layer disposed between the bracket and the fixing layer or between the bracket and the packing member, and the bracket is in indirect contact with the fixing layer or the packing member via the primer layer.

3. The humidifier according to claim 2, wherein the primer layer comprises a rubber adhesive component, an acrylic adhesive component, a polyurethane adhesive component, an epoxy adhesive component, a silicone adhesive component, a polyamide-based adhesive component, a polyimide-based adhesive component, or a mixture of two or more thereof.

4. The humidifier according to claim 1, wherein each of the bracket and the packing member has a simple closed curve shape corresponding to a shape of a traverse section of the mid-case.

5. The humidifier according to claim 1, wherein the bracket has a hardness of 60 to 100 Shore A, and the packing member has a hardness of 40 to 50 Shore A.

6. The humidifier according to claim 1, wherein the packing member comprises soft rubber, and the bracket comprises metal, rigid plastic, or hard rubber.

7. The humidifier according to claim 6, wherein the packing member comprises silicone rubber or urethane rubber, and the bracket comprises polypropylene (PP), polyethylene terephthalate (PET), polystyrene (PS), polycarbonate (PC), or acrylic resin.

8. The humidifier according to claim 1, wherein the packing member is in contact also with the fixing layer.

9. The humidifier according to claim 1, wherein the fixing layer comprises:

a first fixing layer in which the ends of the hollow fiber membranes are potted; and a second fixing layer in contact with the bracket, the second fixing layer surrounding the first fixing layer.

10. The humidifier according to claim 9, wherein the first fixing layer and the second fixing layer are formed of an identical material.

11. The humidifier according to claim 9, wherein both the first fixing layer and the second fixing layer comprise polyurethane (PU) resin.

12. The humidifier according to claim 9, wherein the end of the first inner case is potted in the first fixing layer.

13. The humidifier according to claim 1, wherein the hollow fiber membranes comprise a first group of hollow fiber membranes and a second group of hollow fiber membranes, the first group of hollow fiber membranes is disposed in the first inner case, the humidifying module further comprises a second inner case in which the second group of hollow fiber membranes is disposed, the fixing layer comprises:

a first fixing layer in which ends of the first group of hollow fiber membranes are potted;

a second fixing layer in which ends of the second group of hollow fiber membranes are potted; and a third fixing layer in contact with the bracket, the third fixing layer surrounding the first and second fixing layers, the second inner case is inserted into the mid-case through a second hole formed in the partition wall so as to be supported by the partition wall, the second inner case has a third group of holes located in the off-gas introduction space and a fourth group of holes located in the off-gas discharge space such that off-gas introduced into the second inner case from the off-gas introduction space through the third group of holes flows inside the second inner case and comes out to the off-gas discharge space through the fourth group of holes, the end of the first inner case is potted in the first fixing layer, an end of the second inner case is potted in the second fixing layer, and the ends of the first and second groups of the hollow fiber membranes protrude from the ends of the first and second inner cases such that the ends of the first and second groups of the hollow fiber membranes potted in the first and second fixing layers are open while the ends of the first and second inner cases are entirely within the first and second fixing layers, respectively.

\* \* \* \* \*